United States Patent [19]
Fujita et al.

[11] Patent Number: 5,130,371
[45] Date of Patent: Jul. 14, 1992

[54] CRYSTALLINE POLYOLEFIN GRAFT COPOLYMERS

[75] Inventors: Y. Fujita, Saitama, Japan; Donald N. Schulz, Annandale, N.J.; Wai Y. Chow, Houston, Tex.; Jacques Horrion, Tilff; Trazollah Ouhadi, Liege, both of Belgium; Richard G. Austin, Kingwood, Tex.; Angelo A. Montagna, Houston, Tex.; Kenneth O. McElrath, Humble, Tex.; Jay D. Audett, Houston, Tex.

[73] Assignee: Exxon Chemical Patents Inc., Linden, N.J.

[21] Appl. No.: 490,814

[22] Filed: Mar. 8, 1990

Related U.S. Application Data

[63] Continuation-in-part of Ser. No. 426,128, Oct. 24, 1989.

[51] Int. Cl.$^5$ ............................................. C08G 81/02
[52] U.S. Cl. ...................................... 525/64; 525/186
[58] Field of Search ............. 525/64, 186, 327.7, 525/330.1, 386

[56] References Cited

U.S. PATENT DOCUMENTS

| | | | |
|---|---|---|---|
| 3,972,961 | 8/1976 | Hammer | 525/186 |
| 4,264,747 | 4/1981 | Paddock | 525/86 |
| 4,338,230 | 7/1982 | Ames | 525/386 |
| 4,410,482 | 10/1983 | Subrananian | 264/515 |

FOREIGN PATENT DOCUMENTS 0181587  4/1986  European Pat. Off. .
0364304  4/1990  European Pat. Off. .

OTHER PUBLICATIONS

"The Synthesis & Characterization of Polyisobutylene-Polycaprolactone Block Copolymers", K. R. Gorda, Exxon Research & Eng., Annandale, N.J.

Primary Examiner—Patricia Short
Attorney, Agent, or Firm—W. G. Muller; J. E. Schneider

[57] ABSTRACT

Disclosed herein are block and random graft copolymer compositions comprising a base polymer of crystalline polyolefin to which is grafted at least one side or end chain of a hydroxy-ended polylactone, the process for making said graft copolymer compositions, and use thereof in engineering thermoplastic resins.

4 Claims, No Drawings

CRYSTALLINE POLYOLEFIN GRAFT COPOLYMERS

This application is a continuation-in-part of U.S. patent application Ser. No. 426,128 filed Oct. 24, 1989 pending.

BACKGROUND OF THE INVENTION

1. Field of the Invention

This invention relates to a crystalline polyolefin-polylactone graft copolymer which is effective as a compatibilizing agent or as a modifier for engineering thermoplastic compositions. In particular, the graft copolymer is an effective modifier for engineering thermoplastic compositions comprising thermoplastic polymers that are at least partially miscible with the selected polylactone and will be suitable as a compatibilizing agent for such engineering thermoplastics also additionally comprising a crystalline polyolefin, such as polypropylene or polyethylene.

2. Background Information

Many engineering resins, such as polycarbonate, styreneacrylo-nitrile, and polystyrene/polyphenylene oxide, possess outstanding mechanical properties such as impact resistance, heat resistance, rigidity and dimensional stability. However, such resins suffer from problems with low temperature impact strength, brittleness, resistance to hydrocarbon solvents and difficulties in mold processing. Polypropylene is another well-known engineering thermoplastic. It is one of the lightest major plastics yet because of its high crystallinity, is known to possess high tensile strength, stiffness and hardness. These characteristics allow finished materials made thereof, having good gloss and high resistance to marring. Further, its high melting point allows it to be subjected to elevated temperatures without loss of high tensile strength. High density polyethylene similarly is a relatively low-cost material that because of its high crystallinity exhibits high tensile strength and impact strength. Also it is hydrophobic and can reduce moisture absorption in engineering plastic resins. For both polypropylene and high density polyethylene, their relatively inexpensive availability makes them highly desirable as a component for engineering plastic resins.

It is also well-known that two or more polymers may be blended together to form a wide variety of random or structured morphologies to obtain products that potentially offer desirable combinations of characteristics. However, it may difficult or impossible in practice to achieve many potential combinations through simple blending because of some inherent fundamental problems. Frequently, the two polymers are thermodynamically immiscible which precludes generating a truly homogeneous product. This may not be a problem per se, since often it is desirable to have a two-phase structure. However, typically, high interfacial tension will occur and poor adhesion results between the two phases. This interfacial tension contributes, along with high viscosities, to inherent difficulties in achieving desired degrees of dispersion for random mixtures, and to their subsequent lack of stability. Phase separation or stratification during later processing or use can thus often result. Poor adhesion leads in part, to very weak and brittle mechanical behavior often observed in dispersed blends and may render some highly desired morphologies impossible.

It is generally known that the presence of certain polymeric species, usually block or graft polymers, suitably chosen, may serve as effective compatibilizers. A compatibilizer in this sense is a polymer that has the characteristics of properties permitting it to stabilize, or compatibilize, a multi-phase polymer blend. Compatibilization is believed to occur because of the preferential location of the compatibilizing agent at the interface of the phases in a blend. This preferential location is believed to occur as a result of entanglement of respective segments of the compatibilizer in the phases to which the phases are similar in chemical characteristics. This increases the adhesion between the phases and, as a result of reduced surface energy between the phases, better dispersion is permitted.

U.S. Pat. No. 4,140,482 discloses the formation of a graft copolymer of nylon and polyethylene as part of a blend of nylon and polyethylene. The presence of the graft copolymer is said to have a dramatic effect on the properties of the blends (in this case its permeability) which can be related to its function as compatibilizer. Likewise, U.S. Pat. No. 4,264,747 discloses compatibilizing a blend of styrene acrylo-nitrile resins with styrene-ethylene-butylene-styrene block copolymer where the copolymer has been made compatible with the styrene acrylo-nitrile resin by forming a graft copolymer compatibilizer by grafting a polar monomer which may be the styrene acrylo-nitrile resin onto the block copolymer backbone.

There is, specifically, a continuing need for an improved modifier and/or compatibilizing agent for engineering thermoplastic compositions, such as polycarbonates, with crystalline polyolefins. Continuing work in this area is exemplified in Japanese Patent Application 63-258883 wherein a proposed graft copolymer of a polyester and a polyolefin is suggested for the use as a solubilizer in a resin of a polycarbonate and polyolefin. The modified polyolefin precursor with a graft copolymer is said to contain 0.2-5.0 mol % of epoxy groups that are reactive with a terminal carboxyl group on the selected polyester component of the graft copolymer.

Certain graft polymers containing polylactones are known. EP-A-0181587 relates to anti-static or electrically semiconductive thermoplastic polymer blends in which a first polymer containing a electrically conductive substance forms a continuous phase, and a second polymer, of higher melt viscosity than the first, is blended in this first polymer. Included in suggested polymer blends are those where the first polymer may be polycaprolactone and the second polymer may be a maleic-acid-anhydride-modified polyethylene, maleic-acid-anhydride-modified-ethylene-propylene-diene terpolymer, or maleic-acid anhydride-modified polystyrene. It is taught that copolymers may form at the interface between the two polymer phases by mechanism of a chemical reaction. Such reactions can be, for example, catalyzed or uncatalyzed esterification, where p-toluenesulfonic acid may be the catalytic agent.

In view of the observed need for novel and improved engineering resin compositions, it is the object of this invention to provide a graft copolymer of crystalline polyolefins and polylactone that is useful in the field of engineering thermoplastic compositions. More specifically, an object of the invention is to provide a crystalline polyolefin based graft copolymer effective as a compatibilization agent for engineering thermoplastic resins comprising as one component, crystalline polyolefin. A method for preparation of this graft copolymer is also a specific objective of this invention.

SUMMARY OF THE INVENTION

The present invention is directed to a graft copolymer composition comprising a substantially crystalline polyolefin backbone having chemically bonded thereto through at least one carboxylic acid or acid anhydride functional grouping, a hydroxylended polylactone. The graft copolymer consists of the polyolefin backbone having a polycaprolactone polymer attached thereto in random or essentially block configuration. The polylactone polymer contains sufficient molecular weight configuration and solubility characteristics so that it is at least partially miscible with many of the best known and widely used engineering thermoplastic resins. The crystalline polyolefin backbone polymer selected is of sufficient molecular weight and crystallinity so that it is substantially miscible with polypropylene to be blended with the engineering thermoplastic resin. Thus, this invention is also specifically directed to the use of the graft copolymer as a compatibilizer for engineering thermoplastic resin compositions comprising at least one crystalline polyolefin and at least one additional engineering resin that is at least partially miscible with the polylactone. It is further directed to a process for preparing the graft copolymer compositions comprising combining an acid-group functionalized crystalline polyolefin with a hydroxyl-ended polylactone under conditions sufficient to permit grafting to at least a minor portion of the functionalized polypropylene with the polylactone.

DESCRIPTION OF THE PREFERRED EMBODIMENTS

The polylactone to be graft reacted onto a functionalized polyolefin is a polymer of a lactone in which the lactone ring contains five to seven carbon atoms. Thus, though polyvalerolactone may be used, it is preferred to use polycaprolactone as the polylactone to be incorporated into the graft copolymer composition of the invention. Such polylactone compositions are well-known and can be prepared by methods available in the art. These products are also commercially available for example, from Scientific Polymer Products Inc. located in Ontario, N.Y., and INTEROX SA located in the United Kingdom. Typically the polylactone is produced from lactone monomer utilizing organometallic polymerization catalysts such as diethyl zinc under known polymerization conditions.

The molecular weight of the polylactone is important both for the purposes of the subsequent reaction with the functionalized polyolefin as well as its capability of commingling with specific engineering thermoplastic resins. Thus the polylactone reacted to become a component of the graft copolymer preferably has a number average molecular weight in the range of 2,500 to 200,000, more preferably 10,000 to 100,000. Too low molecular of a molecular weight leads to poor commingling in the engineering resin phase; and too high a molecular weight leads to poor reaction kinetics for the preparation of the graft copolymer.

The graft copolymer composition of the invention may contain cross-links between the functionalized polypropylene base, or backbone, polymer chain. Such cross-links occurs when the backbone contains or carries free functional groups after all available polylactone polymer units have been graft reacted. In this case, the cross-linking may occur directly between the functional groups of adjacent backbone polymer chains or the cross-linking can occur via the polylactone when such polylactone contains more than one hydroxy group. In accordance with the invention cross-linking is to be minimized or even preferably avoided all together, to permit better dispersion in the engineering resin with which used. Accordingly, the polylactone preferably should contain but a single hydroxy group capable of reacting with the functionality on the polypropylene. If some minor degree of cross-linking between backbone polymers is desired, this can be achieved by having additional acid functionality on the polypropylene or utilizing as a portion of the polylactone that which has more than one hydroxyl group.

The graft copolymer composition of this invention comprises the hydroxyl-ended polylactone described above subsequently graft reacted with a functionalized polypolefin. The functionalized polyolefin may be any of the conventionally known crystalline polyolefin compounds that contain carboxylic acid or acid anhydride functional groupings, specifically those based on polypropylene and high density polyethylene. The crystalline polyolefin compound useful as the backbone or base polymer is non-elastomeric, and as is typical of the polypropylene and high density polyethylene, will have an E-Modulus significantly greater than 150 MPa. More particularly, the polyolefin backbone will preferably resemble in molecular weight and crystallinity the polyolefin, particularly polypropylene, component with which the graft copolymer of the invention may be blended. Thus, the molecular weight of the polyolefin backbone is between one-third and three times that of the blend polyolefin and is most preferably equal. While an ideal match is preferred, "mis-matched" weights will be useful to some extent and are considered within the scope of the invention. Thus, a polypropylene backbone will have molecular weights of about 10,000 up to about 10,000,000, or higher, preferably 50,000 to about 300,000 molecular weight. A high density polyethylene backbone will have molecular weight typically above 10,000 up to about 240,000, preferably up to about 180,000. While molecular weights lower than that of the polyolefin blend component will have some effect, the beneficial effects will decrease as molecular weight decreases. Generally speaking, there is little effect for the crystalline polyolefin below its entanglement molecular weight, which is the weight at which there is little incorporation of the polyolefin backbone of the graft copolymer into the polyolefin component of the resin. Similarly, in lower molecular weight the crystalline polyolefin will not be as effective in contributing the sought properties of polyolefin when the graft copolymer is used alone as a modifier. The lower limit of molecular weight considered to be effective for the purposes of this invention is about 10,000 molecular weight ($M_w$).

The crystallinity of the polypropylene is preferably roughly equivalent to that of the polypropylene present in the engineering thermoplastic resin, if present, and accordingly may vary from being semi-crystalline to being completely crystalline. Typically, because of the extensive commercial use of isotactic polypropylene, the polypropylene backbone and resin polypropylene can have a degree of crystallinity greater than about 90%. Generally, the polypropylene is substantially free of other alpha-olefins. However, under certain circumstances small amounts of ethylene, on the order of less than about 15%, by weight, may be incorporated. Furthermore, in certain instances, the polypropylene plastics component of the engineering thermoplastic resins comtemplated in accordance with the invention will contain small amounts of ethylene and constitute copolymers known as "reactor copolymers". Therefore it is within the scope of the invention that the polypropylene backbone contain minor amounts of ethylene both as part of ethylene-propylene segments and as polyethylene segments. Thus as used in the specification and claims, the term "polypropylene" includes homopolymers of propylene as well as reactor copolymers of polypropylene (RCPP) which can contain about 1 to about 15 wt. % ethylene or an alpha olefin comonomer of 4 to 16 carbon atoms. The propylene can be highly crystalline isotactic or syndiotactic polypropylene. The RCPP can be either a random or block copolymer. The density of the PP or RCPP can be about 0.80 to about 0.91 g/cc. As a general rule, the crystallinity or the tacticity of the polypropylene backbone is similar enough to that of the propylene in the blend so as to have the respective polypropylenes co-crystallize. The RCPP, either random or block, can contain sufficient copolymerized ethylene such that co-crystallization with polyethylene in polyethylene-modified engineering resins can occur to a useful extent in accordance with the invention.

Polymerization conditions for the preparation of polypropylene are well-known in the art. Propylene can be polymerized into isotactic polypropylene in the presence of stereo-specific Ziegler-Natta catalyst systems comprising compound of the transition metals of Groups 4 to 6 and 8 of the Periodic Table of elements, preferably titanium compounds, most preferably titanium halides, and organometallic compounds of elements of Groups 1 to 3 of the Periodic Table, especially aluminum alkyls or aluminum alkyl halides. Illustrative examples include titanium trichloride, titanium tetrachloride as catalysts and triethylaluminum and diethyl aluminum chloride as co-catalysts. These transition metal catalyst systems can be non-supported or supported, for example, silica gel, or metal oxides and dihalides, such as MgO, $MgCl_2$, $ZnCl_2$, etc. Such systems can be reacted together and can be complexed with a variety of Lewis-base electron donors. Molecular weight control is typically achieved by the incorporation of hydrogen via a feed stream into the polymerization reactor. The hydrogen is added at about 0 to 30 mole % based on the total monomer. The polymerization reaction is preferably conducted according to the slurry method employing an inert hydrocarbon diluent or liquid propylene as the vehicle. The polymerization temperature can be in the range of about 50° C. to about 100° C. and is preferably at a range of about 60° C. to about 80° C. Polymerization pressure can also vary over a wide range and is not particularly limited. The polymerization pressure can for example be in the range from between atmospheric pressure to $3.7 \times 10^3$ Kpa. Such procedures and components are only illustrative of the knowledge in the art with respect to polypropylene polymerization, any are contemplated as useful within the scope of the invention. For general review of literature and patents in the art see "Olefin Polymers (Polypropylene)" in the Kirk-Othmer Encyclopedia of Chemical Technology, 3rd Edition v. 16, 453-469 (J. Wiley & Sons, 1981).

High density polyethylene (HDPE), useful as the maleated polyolefin for the graft copolymer and as the polyolefin resin of this invention has a density of about 0.941 to about 0.965 g/cc and a crystallinity of at least about 90%. High density polyethylene is an established product of commerce and its manufacture and general properties are well known to the art. Typically, HDPE has a relatively broad molecular weight distribution, characterized by the ratio of weight average molecular weight to number average molecular weight of from about 20 to 40. It is typically polymerized by Ziegler catalysts at from 1 to 100 atm (15 to 1500 psi) at from room temp. to 200° F. The catalyst is a metal alkyl, e.g., triethylaluminum, plus a metallic salt ($TiCl_4$) dissolved in a hydrocarbon solvent. A vapor-phase modification of this process is also known. Another known method uses such metallic catalysts as $Cr_2O_3$ at 100-500 psi with solvents such as cyclohexane or xylene.

The crystalline polyolefin is to contain at least one carboxylic acid or anhydride functional grouping and can be prepared by any method known in the art. In particular, the polypropylene can be copolymerized with certain non-conjugated diene comonomers under typical Ziegler-Natta catalysis conditions described above. Methods of preparation of copolymers of propylene and non-conjugated diene are known, for example, see U.S. Pat. Nos. 4,366,296 and 4,680,318. The non-conjugated diene containing copolymer thus prepared can then be reacted by known methods with ethylenically unsaturated carboxylic acid anhydrides, typically by such methods as thermal addition reactions between the respective ethylenic unsaturations. Use of free radical initiators are avoided by this method and attendant chain scission, i.e., breakdown in molecular weight of the polypropylene, is avoided. Typically a graft copolymer of polypropylene with random grafts of the polylactone are thereby produced. In a preferred process, the functionalized polyolefin can be prepared by direct maleinization.

The direct maleinization of the polyolefin compound to maleated polyolefin is conveniently accomplished by heating a blend of polyolefin and ethylenically unsaturated carboxyl group-containing compounds, e.g., maleic anhydride, within a range of about 150°-400° C., often in the presence of free-radical initiators such as organic peroxides that are well-known in the art. Free-radical grafting of the carboxyl group-containing compounds onto the polyolefin readily results. Methods of preparing these graft polymers are well-known in the art as illustrated, inter alia, in U.S. Pat. Nos. 3,480,580, 3,481,910, 3,577,365, 3,862,265, 4,506,056, and 3,414,551 the disclosures of which are incorporated herein by reference. An independent source of the description of the process if found in Y. Minoura, M. Ueda, S. Mizinuma and M. Oba, J. Applied Polymer Sci. 13, 1625 (1969). The use of heat and/or physical shearing optionally with the free-radical intiators, in such equipment as extruders, masticators, and the like, to simulataneously accomplish controlled degradation in molecular weight of the polypropylene along with the free-radical grafting of the maleic anhydride, all as known in the art, will be useful in accordance with this invention.

In particular for polypropylene, it is preferable to conduct the maleinization with such amounts of maleic anhydride and free-radical initiators, and under conditions of temperature and shearing such that free-radical sites on the polypropylene are formed substantially at the time of scission of the polypropylene chains and are formed at the point of such scission. The maleic anhydride is then grafted onto the scissioned end of one side of such broken chains. In this manner the acid/anhydride groups are located principally at the ends of the maleated polypropylene chains, and the substantial majority of such maleated polypropylene chains contain one site of maleinization. This permits grafting of the maleated polypropylene at its maleated end to the hydroxyl-ended polylactone. This will achieve in effect a graft copolymer of polypropylene with a polylactone block. Multiple sites of maleinization can lead to grafting of the maleated polypropylene to other maleated polypropylene chains or at more than one site of dually hydroxy-ended polylactones. This can result in the formation of cross-linked, polymer networks, or gel, that in substantial amounts will be somewhat detrimental to the objects of this invention, and is less preferable.

In accordance with the above, the free-radical initiator is preferably used and will typically be utilized in an amount of form about 0.1 to 1.0 wt. %, preferably from about 0.2 to 0.5 wt. %, and most preferably from about 0.4 to 0.3 wt. % of the total polypropylene, and solvent, if used, will be added first. The mixture is then heated to a temperature at or about the known decomposition temperature of the selected free-radical initiator, concurrently with any optional mechanical shearing. The maleic anhydride is subsequently added in an amount typically from about 0.1 to 10.0 wt. %, preferably from about 0.1 to 5 wt. %.

The maleated polyolefin of this invention thus will contain from about 0.1 wt. % incorporated maleic anhydride, based upon the weight of the maleated polyolefin, and can range up to about 10 wt. %. Preferably the maleic anhydride content will be from about 0.5 to about 5 wt. %, most preferably about 4 wt. %. As will be apparent, unreacted polyolefin will also be present in the reaction mix as will minor amounts of reaction by-products, such as decomposed free-radical initiator compounds and low molecular weight free-radical initiator compounds and low molecular weight free-radical products. These by-products are substantially removed, by methods known in the art, e.g., sparging with nitrogen or washing with water. Maleic anhydride may not be left in substantial amounts in the polymer without detrimental affects on the subsequent reaction of the hydroxyl-ended polylactone with the maleated polypropylene.

Though maleic anhydride has been exemplified above, any of the known sources of anhydride functionalities may be utilized similarly in amounts proportional to that described for the maleic anhydride. Thus the anhydride functionality can be derived from an unsaturated dicarboxylic acid/anhydride entity such as maleic anhydride, citraconic anhydride, itaconic anhydride, himic anhydride (i.e., 5-norbornene-endo-2,3-dicarboxy anhydride), tetrahydrophthallic anhydride, nadic anhydride, nadic methyl anhydride, dodecenylsuccinic anhydride and their derivatives; of these, maleic anhydride is the preferred source of anhydride functionality. Unsaturated monocarboxylic acids/anhydrides are also contemplated as useful within the scope of this invention, though in each case conversion from the acid to the anhydride form is considered highly important to the subsequent esterification reaction. This conversion occurs naturally at typical melt-processing conditions, all as is known. The unsaturated dicarboxylic acid/anhydrides listed are preferred due to the increased reactivity of the oxygen groups in the ring configurations.

In broadest terms, the process for preparing the graft copolymer of this invention comprises combining with the hydroxy-ended polylactone, the functionalized polyolefin under conditions sufficient to permit grafting of at least a minor portion of the polylactone with the polyolefin. The process thus comprises reacting functionalized polyolefin containing at least one carboxylic acid or anhydride functional grouping with hydroxyl-ended polylactone. Accordingly the graft copolymer composition of the invention will comprise the reaction product of the above described hydroxy-ended polylactone having at least one hydroxy group and the functionalized polyolefin. The reaction is accomplished by contacting the hydroxy-ended polylactone with the functionalized polyolefin where upon interaction, principally by an esterification reaction, takes place. The polylactone is thus grafted to the functionalized polyolefin through covalent chemical functional linkages constituting the chemical bonding between the copolymer segments.

An approximately equivalent molar equivalent of hydroxy-ended polylactone for the molar portion of acid functionality on the polyolefin can be employed but an excess, up to 3–4 molar equivalents of polylactone to acid functionality will be preferred. The contacting can be accomplished by combining solutions of the polymeric reactants in suitable solvents, such as xylene and other inorganic solvents, in a suitable reaction vessel under substantially anhydrous conditions. Heating will accelerate the reaction and is generally preferred. More preferably, commercially, the contacting can be accomplished by mixing of pre-formed pellets of the neat hydroxy-ended polylactone and functionalized polyolefin and melt processing in a physical blender or mixer, such as an extruder, at temperatures from about ambient to about 200° C., preferably in the higher ranges for better reaction, that is from about 140 to about 190, and most preferably 160 to about 185. As the desired reaction is an esterification reaction, it can be and often preferably will be catalyzed, for example by p-toluenesulfonic acid. Minimization of the formation of gel product can be accomplished by at least two different means, as indicated above, reducing the level of carboxylic acid or anhydride functionality on each polyolefin segment to as little a one site per polyolefin chain, and, using hydroxy-ended polylactone containing but a single hydroxyl site. Alternatively, the order of mixing of polymer reactants and catalyst can be altered to maximize the reaction product while minimizing gelling. This is accomplished by pre-mixing the functionalized polyolefin and the hydroxy-ended polylactone, before the addition of catalyst, and subsequent addition of acid catalyst.

It is important for the purposes of obtaining an efficient graft reaction and the resulting reaction product that dispersion of the polylactone in the functional polyolefin is achieved. Generally, the viscosity of polylactone will be extremely low compared with that of the functionalized polyolefin. To increase the viscosity of the polylactone for purpose of improving dispersion, it can be pre-blended with any polymers of a high $T_g$ with which it may be miscible. Both polycarbonate and styrene-acrylo-nitrile copolymers will be effective to increase viscosity of the polylactone for subsequent blending with the functionalized polyolefin; the addition of the catalyst will then be sufficient to produce desired reaction product.

The improved engineering thermoplastic resin compositions that can be prepared utilizing the graft copolymer of this invention, generally will comprise from about 0 to 90 wt. % crystalline polyolefin, from about 10–100 wt. % engineering thermoplastic resin, and from about 1 to about 40 wt. % of the graft copolymer of the invention. More preferably, the resin compositions that can be prepared using the graft copolymer of the invention can have about 60 to about 90 wt. % polyolefin, about 9 to about 35 wt. % engineering thermoplastic resin, and about 2 to about 30 wt. % graft copolymer. Most preferably, the graft copolymer is incorporated at about 5 to about 20 wt. % of the composition, with the polyolefin and other engineering thermoplastic resin adjusted within the foregoing ranges. All weight percentages are based on the total weight of the combined polymers making up the final blend composition.

Generally, the engineering thermoplastic blend compositions prepared using the graft copolymer can be prepared by mixing the graft polymer, engineering thermoplastic resin, and polyolefin components in any order and subjecting the mixtures to temperatures, for example, 175° to about 250° C. Such mixing and heating can be accomplished using any conventional hot processing in the art such as a Banbury mixer, a roll mill, a twin-screw extruder, etc., and employing known thermoplastic processing techniques. Optionally, a masterbatch blended technique can be employed. In this method, the graft copolymer of the invention is pre-mixed with a portion of either polyolefin or the engineering thermoplastic resin, wherein the polyolefin or the engineering thermoplastic resin makes up 30 to about 50 wt. % of the total weight of the total weight of the masterbatch blend, and about 3 to about 12% of the total amount of the amount of polyolefin or engineering thermoplastic component of the engineering thermoplastic resin composition being prepared. This blend is then subjected to the above mentioned blending conditions. This produces a melt-flowable thermoplastic blend having the graft copolymer intimately dispersed in a continuous polyolefin or engineering thermoplastic resin phase. This blend can be pelletized for ease of handling. The masterbatch blend is then available for intimate mixing with the polyolefin component, neat engineering resin, or mixtures, at an elevated blending temperature at desired ratio to produce the engineering thermoplastic resin compositions according to the invention.

Engineering resin compositions suitable in accordance with the invention can be those based upon any of the engineering resins at least partially miscible with the polylactone segment of the graft copolymer, as determined by conventional means. Thus, such engineering resins as polycarbonate, styrene acrylo-nitrile, polybutyleneterephthalate, polyethylene terephthalate, polyamide, polystyrene, styrene maleic anhydride copolymer, acrylo-nitrile butadiene/styrene copolymer, polyacetal, polyvinyl chloride or polyvinylidene chloride (insofar as these are used as engineering resins), polyphenylene oxide/ether, or mixtures of two or more of any of the foregoing are suitable in accordance with the invention. Miscibility is determined empirically by methods known in the art, for example, differential scanning calorimetry (DSC), scanning electron microscopy (SEM), or light scattering.

The compositions of this invention, as with other thermoplastic blends known in the art, can contain stabilizers, anti-oxidants, fillers, processing aids, pigments and other additives desired in normal and conventional amounts, dependent upon the desired end use. Where improved impact strength of the final thermoplastic blend is desired, particularly in low temperature utilization applications, elastomeric polymer compositions can be incorporated in conventional amounts to provide the impact strength improvement. In particular, reference is made to co-pending application U.S. Ser. No. 426,128 which provides description of various functionalized elastomers that will be particularly useful in compositions prepared in accordance with this invention. The disclosure of U.S. application Ser. No. 426,128 is hereby incorporated by reference. The engineering thermoplastic blend compositions of the invention can be used to produce films, filaments, rods, protective coatings, molded and extruded shaped articles, and the like by procedures known in the art.

The following examples are provided to illustrate, but not limit, the invention disclosed herein.

EXAMPLE 1–5

In examples 1–5, a graft reaction between maleated polypropylene and hydroxyl-ended polycaprolactone was conducted in a solvent reaction. Each of these examples describe the graft reaction conducted in a refluxing xylene solution. The reaction was conducted at a temperature below the boiling point of the xylene solvent. Different levels of maleic anhydride functionality on the polypropylene were examined with both single and double hydroxyl-ended polycaprolactone. The feed level of polycaprolactone to polypropylene into to the reactor was varied. P-toluenesulfonic acid was added as a catalyst in some of the reactions. Additionally, reaction times were varied. Optimum conditions were found to occur at the longer reaction time, higher maleic anhydride content and upon addition of approximately one equivalent of p-toluenesulfonic acid (equivalents here are to the molar amount of incorporated maleic anhydride on the polypropylene). In each example, solvent and unreacted polycaprolactone were removed by cooling and adding acetone, a non-solvent, to precipitate the polymer, followed by centrifugation and filtration with excess acetone. Samples were dried under vacuum at 70° C. for 24 hours. Analysis of the reaction results showed the production of a graft copolymer of polycaprolactone chemically bonded to the functionalized polypropylene through the carboxylic acid anhydride grouping. Specifics for each example are illustrated in Table 1.

EXAMPLES 6–12

In examples 6–12, the graft reaction was conducted during melt processing. It was sought here to improve reactivity by operating at a higher reaction temperature. In this case pellets of the functionalized polypropylene, plus pellets of hydroxy-ended polycaprolactone, were both added to a Brabender Mixer (melt-processing equipment used) and blended for approximately 10 minutes at temperatures around 180° C. Again, the amount of the maleic anhydride functionality on the polypropylene, as well as the hydroxy functionality on the polycaprolactone, were varied. Feed ratios of the polycaprolactone to the functionalized polypropylene were kept approximately the same as for the solution reaction above. P-toluenesulfonic acid was added as a catalyst along with the polymer pellets in all except Example 12. In Example 12, catalyst was added after pre-mixing of the functionalized polypropylene and the hydroxyl-ended polycaprolactone.

As indicated in these examples, approximately one molar equivalent of the catalyst to the amount of maleic anhydride on the polypropylene was used to achieve better grafting. Addition of catalyst in levels of more than two equivalents was not tried since at two equivalents homogeneous mixing became impossible due to cross-linking of the polymers. Example 11 shows the increase in the amount of polycaprolactone grafted and is an indication of the cross-linking that occurred. In Example 12, the addition of catalyst was delayed for the pre-mixing of the polymer components and succeeded in substantially reducing the crosslinking.

by Scanning Electron Microscopy, showed that the polycarbonate phase was dispersed in phase domains having an approximate size of 20 micron. The addition of the maleic anhydride functionalized polypropylene did not decrease domain size over the binary blend. However, the addition of the graft copolymer of functionalized polypropylene with the hydroxyl-ended polycaprolactone showed much improved dispersion with the domain size of polycarbonate being reduced to

TABLE 1

| | | | GRAFT REACTION IN SOLUTION | | | | | |
|---|---|---|---|---|---|---|---|---|
| EXAMPLE NO. | POLY-PROPYLENE ($M_w$) | MALEIC ANDRIDE (wt. %) | POLY-CAPROLACTONE (PCL) ($M_w$) | FEED OF PCL (wt. %) | CONC. OF PP & PCL (wt. %) | CATALYST (mol. eq.) | RXN. TIME (hr) | PCL GRAFTED TO PP (phr) |
| 1 | 178,000 | 0.75 | 23,000[1] | 50 | 11.1 | 0 | 2 | 1.31 |
| 2 | 113,000 | 2.05 | 3,000[2] | 70 | 18.5 | 1.0 | 24 | 5.07 |
| 3 | 58,900 | 4.0 | 23,000[1] | 70 | 18.5 | 1.0 | 24 | 15.42 |
| 4 | 58,900 | 4.0 | 23,000[1] | 70 | 18.5 | 1.0 | 24 | 13.10 |
| 5 | 58,900 | 4.0 | 23,000[1] | 70 | 18.5 | 0 | 24 | 11.38 |

[1] mono-hydroxyl
[2] di-hydroxyl

Examples 9 and 10 show a slight decrease in grafting efficiency as a result of the use of a hydroxyl-ended polycaprolactone with one hydroxyl functionality, as compared to a hydroxyl-ended polycaprolactone with two hydroxyl groups. Comparison of dynamic viscosity measurements for representative samples showed that there was a significant decrease in viscosity and demonstrated that for the use of single hydroxy-ended polycaprolactone and for a subsequent addition of the acid catalyst, the formation of gel was suppressed. Details of the graft reaction appear in Table 2.

approximately 2 micron, thus demonstrating the use of the graft copolymer of the invention as a compatibilizer for the polypropylene and polycarbonate engineering resin.

TABLE 2

| | | | GRAFT REACTION IN MELT | | | | | |
|---|---|---|---|---|---|---|---|---|
| EXAMPLE NO. | POLY-PROPYLENE (PP) ($M_w$) | MALEIC ANHYDRIDE (wt. %) | POLYCAPROLACTONE (PCL) ($M_w$) | FEED PCL (wt. %) | CATALYST (mol. eq.) | TEMP (°C.) | TIME (Min.) | PCL GFTD. TO PP (phr) |
| 6 | 178,000 | 0.75 | 32,000[2] | 70 | 1.0 | 180 | 10 | 1.36 |
| 7 | 110,000 | 1.80 | 32,000[2] | 70 | 2.2 | 180 | 10 | 4.07 |
| 8 | 58,900 | 4.0 | 32,000[2] | 70 | 0.1 | 180 | 10 | 0.0 |
| 9 | 58,900 | 4.0 | 32,000[2] | 70 | 1.0 | 180 | 10 | 10.87 |
| 10 | 58,900 | 4.0 | 23,000[1] | 70 | 1.0 | 180 | 10 | 9.04 |
| 11 | 58,900 | 4.0 | 32,000[2] | 70 | 2.0 | 170 | 10 | 42.35 |
| 12 | 58,900 | 4.0 | 32,000[2] | 70 | 2.0 | 180 | 10 | 16.68 |

[1] mono-hydroxyl
[2] di-hydroxyl

EXAMPLE 13

In this example, the graft copolymer prepared in Example No. 5 in a solvent reaction process was blended with polypropylene and polycarbonate to illustrate its function as a compatibilizer for engineering plastic resins. For comparison purposes, blends of polypropylene and polycarbonate and blends of polypropylene, maleic anhydride functionalized polypropylene and polycarbonate, were also prepared by melt-blending processes; i.e., a Brabender Mixer at 260° C., 60 rpm for 5 minutes. The graft copolymer consisted of 100 phr of maleic anhydride grafted polypropylene with 11.4 phr of polycaprolactone. The tested blend consisted of homopolypropylene, graft copolymer and polycarbonate in a ratio of 70:15.6:30. The comparative samples consisted of homopolypropylene and polycarbonate in a 70:30 ratio, and homopolypropylene, maleic anhydride functionalized polypropylene (0.74 wt. % maleic anhydride) and polycarbonate in a 70:14:30 weight ratio. In the polypropylene-polycarbonate blend, analysis, surprisingly this result was obtained by use of the Example No. 5 graft copolymer which provided only approximately 1.4% by weight of polycaprolactone in the overall engineering thermoplastic resin.

EXAMPLE 14

In this example maleated polypropylene (PP) was graft reacted with polycaprolactone during melt processing and the reaction product (PP-g-PCl) blended with two engineering thermoplastic resins, polystyrene (PS) and polyphenylene oxide (PPO) to illustrate the compatibility of the resulting blend.

The graft copolymer was prepared as follows. Maleated PP (90 g) was added to a Brabender Mixer at 190° C. (20 rpm). This maleated PP was prepared by the thermal addition of maleic anhydride to a diene-modified PP ($M_w \sim 150,000$; MFR 16.8; 0.7 mol. % diene). The other ingredients, polycaprolactone (40K MW, 137.7 g), p-toluenesulfonic acid (6.2 g), and Irganox 1010 (0.24 g) (an antioxidant, BHT) were added and purged with nitrogen. The speed was increased to 60 rpm for 15 minutes. The grafted polymer was isolated by grinding into a fine powder and extracting with refluxing acetone for 80 hours. The polymer was filtered and dried in a vacuum oven at 70° C. overnight. After dissolving in xylene and precipitating with acetone 3 times, infrared analysis gave 0.78 wt. % PCL.

The engineering resin composition was prepared as follows. A Brabender Mixer at 220° C. was purged with nitrogen. The mixer speed during addition was 20 rpm. Polystyrene (274K MW, 8.4 g) and PPO (24 MW, 25.2 g) were added. Once mixing was achieved, PP-g-PCl (14.4 g) was added and mixed for 60 minutes to yield a PS+PPO/PP-g-PCl blend in a weight ratio of 70:30. The materials blended were analyzed for thermal stability and found to be stable beyond the melting point of PP.

EXAMPLE 15

In this example the use of high density polyethylene (HDPE) for both the graft copolymer and in the engineering resin blend is illustrated. A commercially available (EXXON CHEMICAL COMPANY, Houston, Tex.) HPDE of M.I. 8.3 (ASTM-D1238, condition E) is graft reacted in a twin-screw extruder to obtain a functionalized HDPE having M.I. 2 to 2.8 and 0.5 to 0.65 wt. % of grafted maleic anhydride. The functionalized HDPE and polycaprolactone are introduced into xylene solvent at a temperature below its boiling point and reacted for 24 hours in the presence of about 1 mol. equivalent of p-toluenesulfonic acid. A graft copolymer of HDPE and polycaprolactone results, and is separated from solvent and unreacted polycaprolactone as described for Example 14.

The graft copolymer is then melt-blended with HDPE and polycarbonate, in a Brabender mixer operated at 260° C., 60 rpm for 5 minutes, in a ratio of HDPE/graft copolymer/polycarbonate of 70:15.6:30. Comparison of analyses by SEM should show a decrease in polycarbonate domain size from about 20 micron for HDPE/polycarbonate similarly prepared to below about 5 micron for the invention blend.

Although the invention herein has been described with reference to particular means, materials and embodiments, it is to be understood that the invention is not limited to the particulars disclosed and extends to all equivalents within the scope of the following claims.

What is claimed is:

1. A graft copolymer consisting of crystalline polypropylene containing at least one carboxylic acid or anhydride functional grouping and a hydroxyl-ended polylactone bonded to said functional grouping, said polypropylene having a number average molecular weight of from 50,000 to 300,000 and said polylactone having a number average molecular weight of from 10,000 to 100,000.

2. The graft copolymer composition defined in claim 1 wherein said hydroxyl-ended polylactone is polycaprolactone or polyvalerolactone.

3. The graft copolymer composition defined in claim 1 wherein said functional grouping is maleic anhydride.

4. The graft copolymer composition defined in claim 3 wherein said maleic anhydride is grafted onto one end of said polypropylene backbone.

* * * * *